Figure 1:
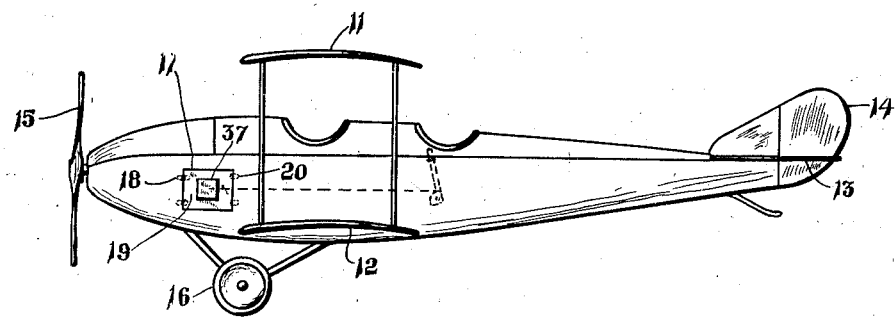

C. P. SALGEE.
BRAKE FOR AEROPLANES.
APPLICATION FILED MAY 2, 1921.

1,400,462.

Patented Dec. 13, 1921.
5 SHEETS—SHEET 1.

Charles P. Salgee
INVENTOR

C. P. SALGEE.
BRAKE FOR AEROPLANES.
APPLICATION FILED MAY 2, 1921.

1,400,462.

Patented Dec. 13, 1921.
5 SHEETS—SHEET 2.

Charles P. Salgee
INVENTOR

BY Victor J. Evans
ATTORNEY

WITNESS: Alfred J. Bratton

C. P. SALGEE.
BRAKE FOR AEROPLANES.
APPLICATION FILED MAY 2, 1921.

1,400,462.

Patented Dec. 13, 1921.
5 SHEETS—SHEET 3.

Charles P. Salgee
INVENTOR

BY Victor J. Evans
ATTORNEY

Alfred F. Bratton
WITNESS

C. P. SALGEE.
BRAKE FOR AEROPLANES.
APPLICATION FILED MAY 2, 1921.
1,400,462.
Patented Dec. 13, 1921.
5 SHEETS—SHEET 4.
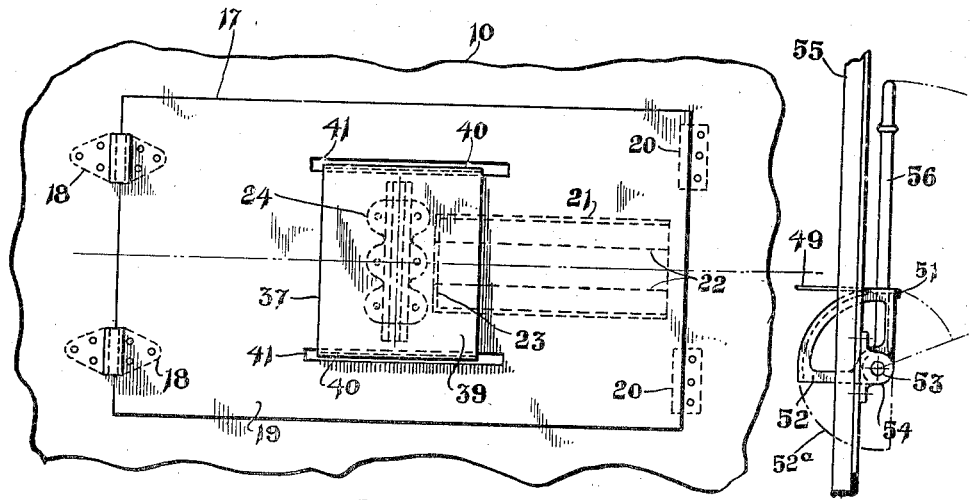
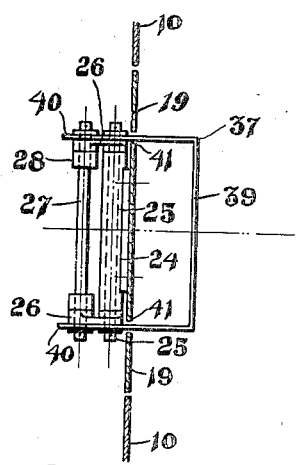
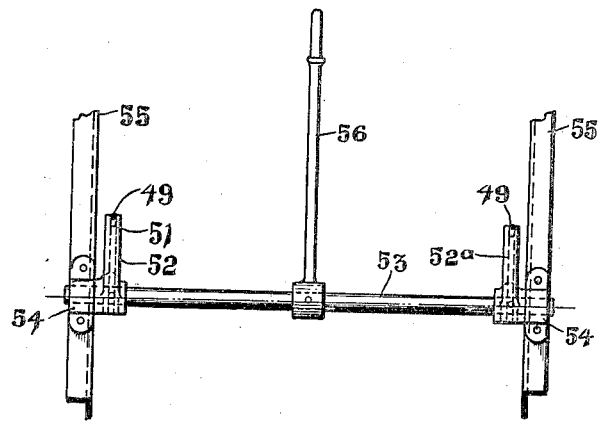
Charles P. Salgee
INVENTOR
BY Victor J. Evans
ATTORNEY
WITNESS:

C. P. SALGEE.
BRAKE FOR AEROPLANES.
APPLICATION FILED MAY 2, 1921.

1,400,462.

Patented Dec. 13, 1921.
5 SHEETS—SHEET 5.

Charles P. Salgee
INVENTOR

BY Victor J. Evans
ATTORNEY

Alfred J Bratton
WITNESS:

UNITED STATES PATENT OFFICE.

CHARLES P. SALGEE, OF PHILADELPHIA, PENNSYLVANIA.

BRAKE FOR AEROPLANES.

1,400,462. Specification of Letters Patent. Patented Dec. 13, 1921.

Application filed May 2, 1921. Serial No. 466,256.

*To all whom it may concern:*

Be it known that I, CHARLES P. SALGEE, a citizen of the United States, residing at Philadelphia, in the county of Philadelphia and State of Pennsylvania, have invented new and useful Improvements in Brakes for Aeroplanes, of which the following is a specification.

This invention relates to flying machines and more particularly to machines of that type or form generally known as aeroplanes the primary object being to provide a novel means whereby the forward movement may be promptly retarded or arrested when making nose dives or when falling and similarly increasing the factor of safety very considerably when a landing is being effected.

A further object of my invention is the provision of means whereby an aeroplane can be quickly brought to a halt or stopped after a relatively short surface run.

Another object of this invention is to provide an effective means whereby forced or sudden landings are more easily and safely brought about in that a positive means is employed for retarding the momentum of the machine instantly it touches the landing surface.

Still further my invention has for an object the provision of a novel means whereby greater safety in flight is effectively insured.

With the foregoing and other objects in view as will later on be more apparent as this description proceeds my invention consists essentially in providing an aeroplane fuselage with what I prefer to term brake wing-planes or current deflectors and auxiliary pocket planes which are coupled up in opposed pairs or in series, and in the novel features of construction, combination and arrangements of parts hereinafter fully described and more specifically defined by the appended claims.

In the further disclosure of the invention reference is to be had to the accompanying sheets of explanatory drawings constituting a part of this specification, and in which like characters of reference designate the same or similar parts in all the views.

Figure 1— is a side elevation of an aeroplane having my invention applied thereto, the retarding or braking wing planes being shown in the closed or inoperative position.

Figure 2:
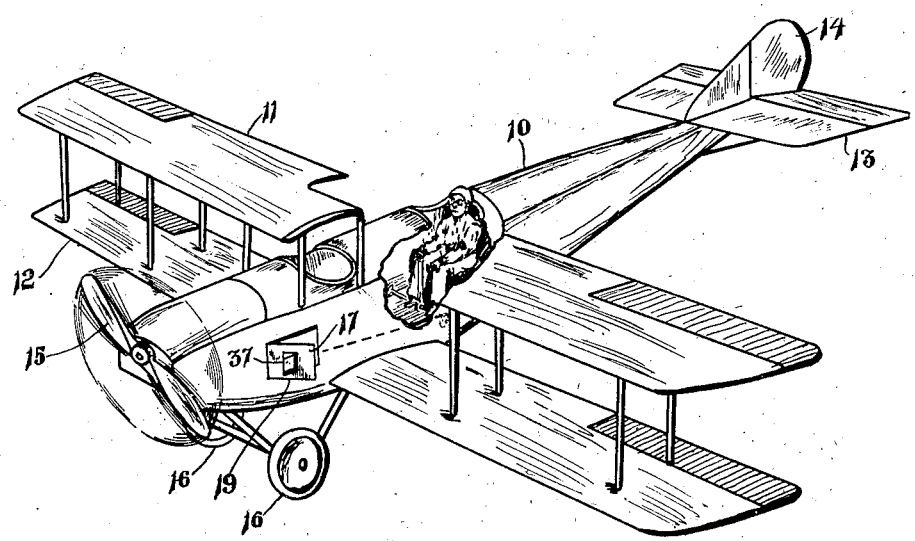

Fig. 2— is a perspective view of the aeroplane with the wing-planes open or in the braking or retarding position.

Figure 3:
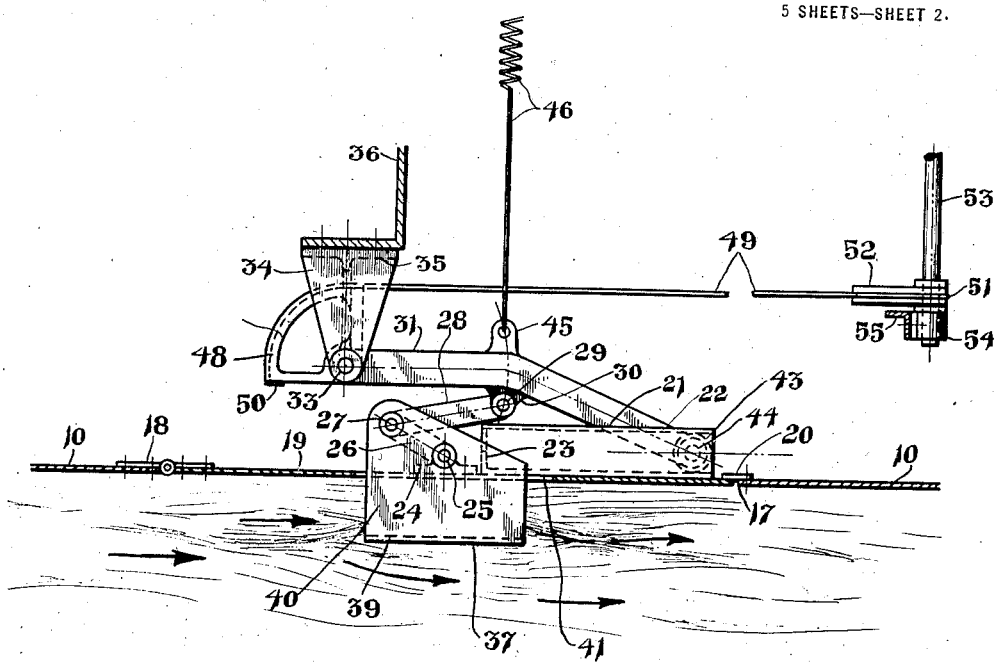

Fig. 3— is an enlarged detail plan of one of the retarding or braking wing planes in the closed position and illustrating the normal flow of the air currents relative thereto and through the auxiliary pocket plane.

Figure 4:
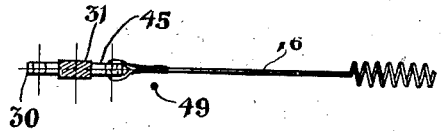

Fig. 4— is a fragmentary detail showing the method of attaching the wing-plane collapsing spring to the wing-plane operating lever.

Figure 5:
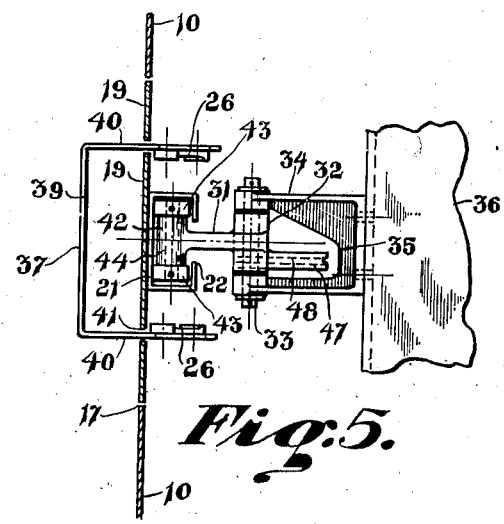

Fig. 5— is an end view of the bearing lever and associated parts and looking to the left hand of Fig. 3.

Figure 6:
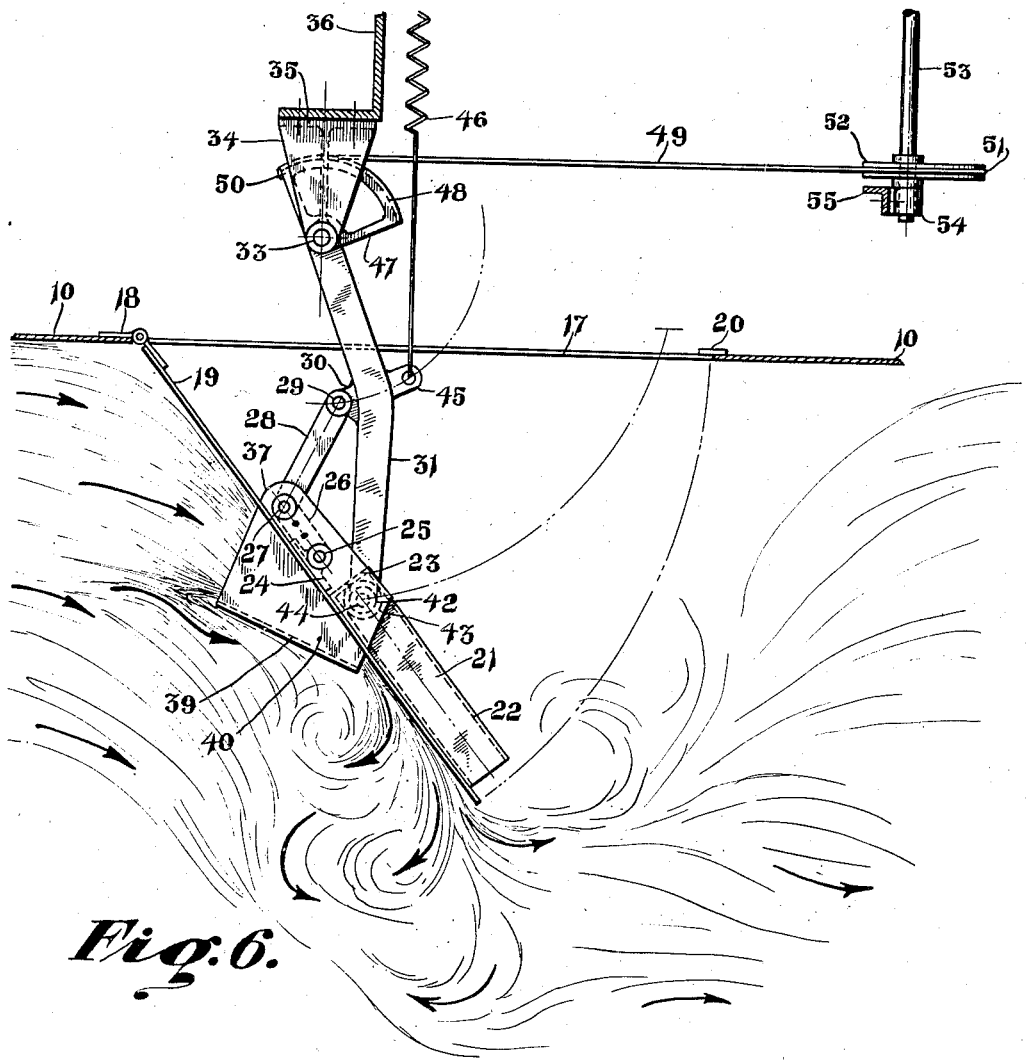

Fig. 6— is an enlarged detail plan view of one of the retarding or braking wing-planes in the open position and illustrating the flow of the air currents thereover when in such position.

Figure 7:
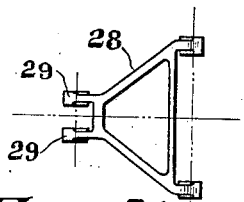

Fig. 7— is a detail of one of the auxiliary pocket plane supporting members.

Figure 8:
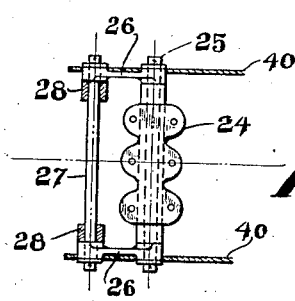

Fig. 8— is a detail view of the means for mounting the pocket plane on the back or inside of the wing-plane or deflector.

Fig. 9— is an enlarged front elevation of the combined wing and pocket planes in the closed position relative to the aeroplane fuselage.

Fig. 10— is a detail end elevation of the operating lever whereby the wing planes are controlled.

Fig. 11— is an end elevation looking toward the right hand of Fig. 9.

Fig. 12— is a front elevation of Fig. 10.

Figure 13:
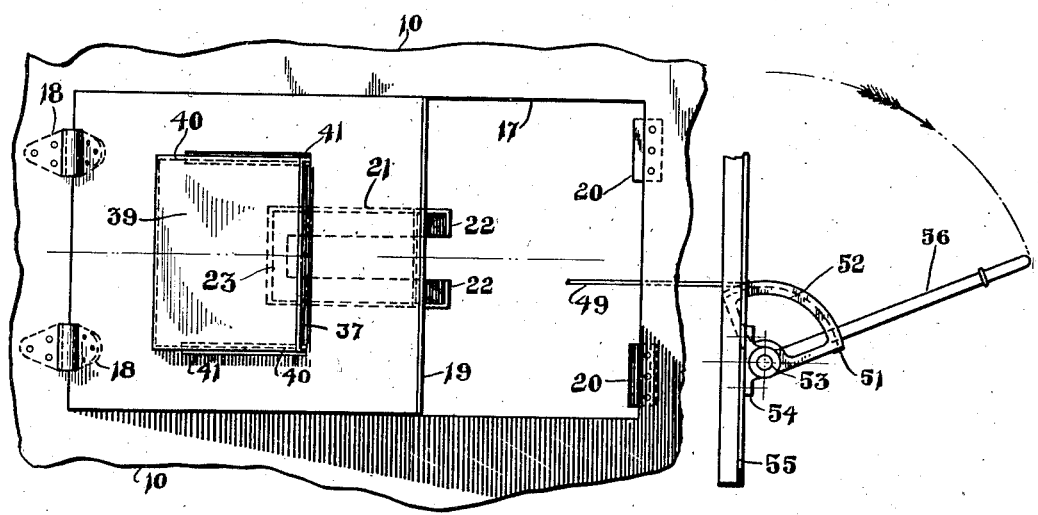

Fig. 13— is an enlarged front elevation of the wing and pocket planes in the open position relative to the aeroplane fuselage, with the operating lever shown by Fig. 10 in its correlated position.

Figures 14, 15:
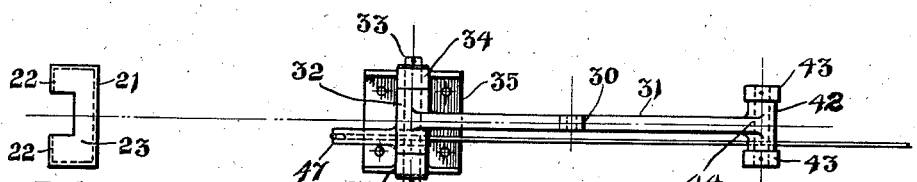

Fig. 14— is a detail end view of the tracks hereinafter referred to.

Fig. 15— is a detail plan view of the bearing, quadrant, operating lever and rollers.

Figure 16:
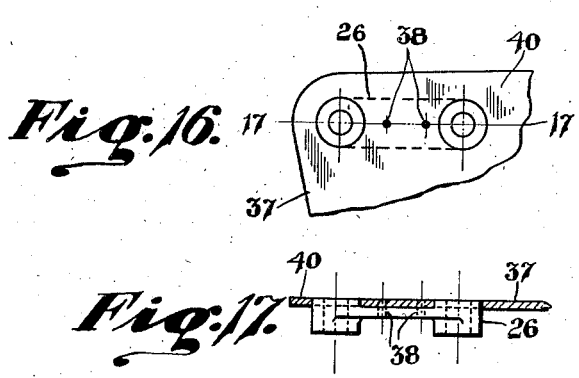

Fig. 16— is a detail enlarged view of the pivot end bearing on the pocket planes.

Figure 17:
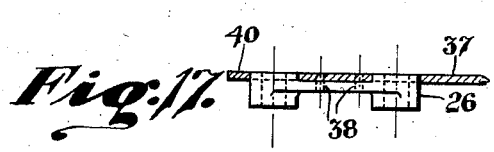

Fig. 17— is a section taken on the line 17—17 in the preceding figure; and

Figure 18:
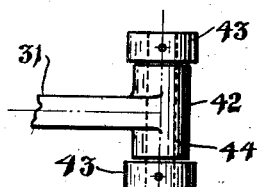

Fig. 18— is a fragmentary enlarged detail of the track traversing rollers.

Referring to the drawings and more particularly to Figs. 1 and 2 which illustrate an aeroplane having my invention applied thereto the numeral 10 designates the fuselage 11, 12, the upper and lower planes, respectively, 13 the elevating planes, 14 the rudder, 15 the propeller and 16 the running wheels all of said parts being according to the well-known patterns and forming no part of this invention.

According to my improvements I form or provide at one or more opposed points in each side of the fuselage 10 openings 17—conveniently rectangular—to the forward edges whereof are attached by plate hinges 18 what I prefer to term wing-planes or deflectors 19, which when closed up snugly fit into the aforesaid openings 17 and strictly conform to the lines of the fuselage; or in other words, when closed up these wing-planes or deflectors 19 fit into the walls of the fuselage 10 and present an unbroken stream line as will be readily understood, stops 20 being fitted wherever deemed desirable to adequately support said wing-planes 19 against buckling due to the outside air pressure when the aeroplane is in full flight.

Rigidly securing on the inner face of each wing-plane or deflector 19 is a horizontally disposed channel-shaped track 21 having inner flanges 22 and the forward end closed by a wall 23, said flanges 22 and wall 23 serving for the purpose later on to be explained, and it is to be here particularly noted that as this description proceeds I am for convenience only describing one wing-plane 19 and its associated parts and operating mechanism, it being obvious that said parts are all duplicated in opposed relation on the other side of the fuselage.

Securely attached to the back of the wing-plane or deflector 19 is a vertically disposed bearing 24 in which is mounted a shaft 25 having upper and lower laterally disposed arms 26 between which is pivotally mounted by a shaft 27 a toggle frame or member 28, of triangular formation and provided with ears 29 at its apex between which is pivoted a lug 30 on the angled operating lever 31 which is hingedly mounted by a boss 32 and hinge pin 33 between the laterally projecting arms 34 of an U-shaped bearing bracket 35, bolted or otherwise securely fixed on a foundation wall or plate 36 transversely disposed in the cockpit of the fuselage 10. It is also to be here particularly remarked that the aforesaid lateral arms 26 are bossed at their outer ends and have mounted thereon what I prefer to term auxiliary or pocket planes 37, countersunk rivets or pins being driven into registering holes 38—Figs. 16 and 17—in order to firmly bond said parts together. These auxiliary or pocket planes 37 are preferably fashioned as shown, that is to say, they are made somewhat channel-shaped in cross-section vertically whereby there is provided an outer wall 39 and superposed parallel polygonal-shaped top and bottom members or flanges 40 which are adapted for movement through spaced horizontal slots 41 in the aforesaid wing-planes 19 as later on explained, and it will be readily understood that said auxiliary or pocket plane 37 is swung about the shaft 25 as an axis.

The aforesaid angled operating lever 31 is fashioned as shown with a rearwardly and outwardly inclined portion which supports at its bossed free end 42 a pair of spaced rollers 43 pinned or otherwise secured on a vertically disposed shaft 44 whereby said rollers 43 rotate therewith in the bossed end 42. These rollers 43 are of a diameter and proportions to ride freely within the hereinbefore described track 21 on the inner face of the wing-plane or deflector 19. Attached to a laterally projecting lug 45 on the angled operating lever 31 is one end of a contractile spring or tension device 46 which tends to normally maintain the wingplane or deflector 19 in closed position against the stops 20 whereby the fuselage presents an unbroken stream line surface; and it is to be particularly borne in mind that the other end of the contractile spring or tension device 46 is similarly connected to the opposed and reversely movable wing-plane—not shown—on the opposite side of the fuselage.

Integral with the bossed end 32 of the angled operating lever 31 I form a laterally and forwardly projecting quadrant 47 provided in its peripheral edge with a groove 48 for the reception of a cable or chain 49 one end whereof is attached at 50 thereto; and said cable or chain 49 is rearwardly conducted and similarly connected at 51 to a second quadrant 52—disposed at right angles with relation to the aforementioned quadrant 47—keyed or otherwise fixed on a horizontal shaft 53 conveniently mounted in bearings 54 supported by vertical standards or angle irons 55 within the fuselage 10. It will of course be clearly apparent that the shaft 53 also carries a second quadrant 52ª —Fig. 12—which serves to operate the opposed wing-plane 19 as hereinbefore mentioned as being arranged on the opposite side of the fuselage 10. A hand or manipulating lever 56 is provided centrally of the shaft 53 and within easy reach of the aviator or pilot so that the wing-planes 19 may be promptly manipulated as and whenever desired.

Having thus described the mechanical details and general assembly of my improved brake for flying machines it will be readily seen that under normal conditions the wing-planes or deflectors 19 are closed in tight against the stops 20 and form a part of the fuselage wall, the hinges 18 being on the inside in no way interfering with the stream lines, while the auxiliary or pocket planes 37 aline therewith in slightly spaced parallel relation and only presenting the edges of the plates from which they are formed to the head wind.

Furthermore, it will be clearly evident that whenever the pilot or aviator desires to make use of the wing-planes or deflectors 19 he simply draws or pulls the manipulating or hand lever 56 forward in the direction of the arrow on Fig. 13 which partially turns the shaft 53 about its axis in a clockwise direction and thereby correspondingly rocks the quadrants 52, 52ª, to the right. This movement of the quadrants 52, 52ª, exerts a pull upon the cables or chains 49 which causes the horizontally disposed quadrants 47 to move to the right-hand about their pivots or hinge pins 33 and due to the integral connection of said quadrants 47 to the angled operating levers 31 the latter are horizontally and outwardly swung in opposition to the normal action of the contractile spring or tension device 46 through the connection thereto of the lugs 45. Now it will be clearly apparent that as the angled operating levers 31 move as aforesaid that the spaced rollers 43 will traverse forward in the tracks 21 until they abut or engage the end walls 23 thereof, and that as a result of said movement the wing-planes or deflectors 19 will be moved slowly outward from the position shown by Fig. 3 to that illustrated in Fig. 6, and I wish here to particularly emphasize the fact that when said wing-planes or deflectors occupy their extreme outward position that they are disposed at an angle of substantially forty degrees relative to the wall of the fuselage 10 as I have discovered that at this particular inclination the strongest eddy or resistance is established; or in other words, the maximum retardation to continued momentum is set up, the stream lines being clearly depicted in both the figures referred to and accentuated by the black arrows thereon. Coincident with the movement of the wing-planes or deflectors 19 as above set forth it will also be seen that the toggle frames or members 28 will have movement imparted thereto due to their connection by the ears 29 to the lugs 30 on the angled operating levers 31, said toggle frames or members 28 through the shaft 27 and lateral arms 26 which are securely pinned to the polygonal flanges 40 of the pocket planes 37 causing same to be swung from parallel relation to the wing-planes or deflectors 19 to an inclined position whereby wedge-shaped pockets are created as will be clearly seen on reference to Fig. 6. It is here to be specially noted that when the pocket planes 37 occupy the position shown by Fig. 6 they act or serve as brakes in connection with the wing-planes or deflectors 19 by creating a powerful head resistance that very materially overcomes and retards the inherent momentum when the plane is effecting a landing.

Obviously on releasing or moving the manipulating or hand lever 56 forwardly the wing-planes or deflectors 19 will automatically close up into the openings 17 under the action of the contractile spring or tension device 46 while the pocket planes 37 will be returned to their normal position shown by Fig. 3 and thereby presenting no impediment or a retarding effect to the flight of the plane.

From the foregoing description and a careful examination of the drawings, it will be readily seen that by my invention there is provided a simple and practical means whereby the head resistance of the flying machine can be promptly increased when effecting a landing, and in view of the fact that the wing-planes 19 are always installed in opposed relation perfect equilibrium is insured. Obviously two or more sets of brake wing-planes or deflectors 19 and their associated parts may be fitted into an aeroplane or flying machine fuselage; for example, one pair of the planes 19 may be installed forward of and another pair aft or in the rear of the pilot's cockpit, and in such instances the quadrants 52, 52ª, for operating the rear wing-planes may be positioned as indicated by the dotted lines 52ᵇ in Fig. 10 whereby both sets of wing-planes or deflectors 19 will be actuated synchronously. Or, separate means of the nature hereinbefore described may be installed for operating each set of wing-planes independently when desired.

Obviously the wing-planes or deflectors 19 may be arranged for operation by any other appropriate means than that illustrated such for instance as pedal mechanism, or in the case of very large flying machines installed with a series of wing-planes or deflectors 19 power mechanism of any suitable type may be used and fitted with clutch devices whereby any one pair of opposed or a number of the opposed wing-planes can be independently or simultaneously employed. Still further it is to be noted that any other suitable tension means may be employed in place of the contractile springs 46 provided it be of a nature to normally tend to hold the wing-planes 19 closed in to the fuselage 10 as well as retain the manipulating lever at the zero position, and it will be seen that the effort required to open out said wing-planes in opposition to the tension means absolutely insures a gradual opening thereof at all times which effectively eliminates any undue strain on the flying machine or its operative parts. As a result of the gradual opening of the wing-planes 19 it will be noted that a variable speed retarding unit is insured which is under perfect control by the pilot at all times.

While there has been carefully described and shown the best form of the invention at present known to me it will be conceded that the same is susceptible of considerable modification and variation to adapt it for particular types of flying machines, and the right is hereby reserved to make such necessary changes to insure its effectiveness under all conditions as well as vary the details of construction and combination of the several parts that may fairly be construed as falling within the scope of the appended claims. For example a false stationary shutter may be fitted within the fuselage 10 and adapted to automatically close the openings 17 when the wing-planes or deflectors 19 are in use so that the entry of air into the cockpit or other part of the fuselage 10 is prevented, it being obvious that such shutters will be of a nature not to interfere with the operating mechanism for said wing-planes or deflectors.

Having described my invention what I claim as new and desire to secure by Letters Patent is:—

1. Means for braking the momentum of flying machines comprising opposed wing-planes normally adapted to close in flush with the body walls thereof, pocket planes inter-associated with said wing-planes, means for simultaneously moving the wing-planes outwardly in opposed forwardly-inclined relation relative to the body walls, and means actuable synchronously with the aforementioned means for swinging the pocket planes into rearwardly inclined relation with respect to the wing-planes.

2. Means for braking the momentum of flying machines comprising a series of opposed wing-planes normally adapted to close in flush with the body walls thereof, pocket planes inter-associated with said wing-planes, means for simultaneously moving the wing-planes outwardly in opposed forwardly-inclined relation relative to the body walls, and means actuable synchronously with the aforementioned means for swinging the pocket planes into rearwardly inclined relation with respect to the wing-planes.

3. Means for braking the momentum of aeroplanes comprising a series of opposed wing-planes normally adapted to close in flush with the body walls thereof, pocket planes inter-associated with said wing-planes, means for simultaneously moving the wing-planes outwardly in opposite forwardly-inclined relation relative to the body walls, and means actuable synchronously with the aforementioned means for swinging the pocket planes into rearwardly inclined relation with respect to the wing-planes.

4. Means for braking the momentum of aeroplanes comprising opposed wing-planes normally adapted to close in flush with the body walls thereof, pocket planes inter-associated with said wing-planes, means for simultaneously moving the wing-planes outwardly in opposed forwardly-inclined relation relative to the body walls, and means actuable synchronously with the aforementioned means for swinging the pocket planes into rearwardly inclined relation with respect to the wing-planes.

5. Means for braking the momentum of flying machines comprising opposed wing-planes normally adapted to close in flush with the body walls thereof, pocket planes inter-associated with said wing-planes, means for simultaneously moving the opposed wing-planes outwardly to an angular position of approximately forty degrees relative to the body walls, and means actuable synchronously with the aforementioned means for swinging the pocket planes into rearwardly inclined relation with respect to the wing-planes.

6. Means for braking the momentum of aeroplanes comprising opposed wing-planes normally adapted to close in flush with the body walls thereof, pocket planes inter-associated with said wing-planes, means for simultaneously moving the opposed wing-planes outwardly to an angular position of approximately forty degrees relative to the fuselage body walls, and means actuable synchronously with the aforementioned means for swinging the pocket planes into rearwardly inclined relation with respect to the wing-planes.

7. Means for braking the momentum of aeroplanes comprising a series of opposed wing-planes normally adapted to close in flush with the body-walls thereof, pocket planes inter-associated with said wing-planes, means for simultaneously moving the wing-planes outwardly to an angular position of approximately forty degrees relative to the fuselage body walls, and means actuable synchronously with the aforementioned means for swinging the pocket planes into rearwardly inclined relation with respect to the wing-planes.

8. The combination with the fuselage of an aeroplane of opposed wing-planes normally closable into the walls thereof, pocket planes inter-associated with the said wing-planes and normally disposed in parallel juxtaposition thereto, means for simultaneously moving the opposed wing-planes outwardly in forwardly inclined relation respective to the fuselage body, and means actuable synchronously with the aforementioned means for swinging the pocket planes into rearwardly inclined relation with respect to the wing-planes.

9. The combination with the fuselage of an aeroplane of vertically hinged opposed wing-planes normally closable into the walls thereof, pocket planes inter-associated with said wing-planes and normally disposed in parallel juxtaposition thereto, means for simultaneously moving the wing-planes outwardly in opposed forwardly-inclined relation relative to the fuselage body, and means actuable synchronously with the aforementioned means for swinging the pocket planes into rearwardly inclined relation with respect to the wing-planes.

10. The combination with the fuselage of an aeroplane of vertically hinged opposed wing-planes normally closable into the walls thereof, pocket planes of channel-shaped cross section inter-associated with said wing-planes and normally supported in parallel juxtaposition thereto, means for simultaneously moving the wing-planes outwardly in opposed forwardly-inclined relation relative to the fuselage body, and means actuable synchronously with the aforementioned means for swinging the pocket planes into rearwardly inclined relation with respect to the wing-planes.

11. The combination with the fuselage body of an aeroplane of vertically hinged opposed wing-planes normally closable into the walls thereof, a bearing in the fuselage body having opposed brackets, laterally movable angle levers supported by said brackets, said angle levers having quadrants at their forward ends and horizontally rotatable rollers at their rear ends, tracks on the inner faces of the wing-planes in which the aforesaid horizontally rotatable rollers operate, tension means for normally drawing the angle levers inward, means for swinging the quadrants simultaneously about their axes whereby the wing-planes are moved outward into opposed forwardly-inclined relation relative to the fuselage body, pocket planes inter-associated with the aforesaid planes and normally disposed in parallel juxtaposition thereto, and means actuable synchronously with the wing-plane operating mechanism for swinging the pocket planes into rearwardly inclined relation with respect to the wing-planes.

12. The combination with the fuselage body of an aeroplane of vertically hinged opposed wing-planes normally closable into the walls thereof, a bearing in the fuselage body having opposed brackets, laterally movable angle levers supported by said brackets, said angle levers having quadrants at their forward ends and horizontally rotatable rollers at their rear ends, tracks mounted on the inner faces of the wing-planes of slotted box-like formation in cross section and the forward ends whereof are closed in, said tracks serving as guides in which operate the aforesaid horizontally rotatable rollers, tension means for normally drawing the angle levers inward, means for swinging the quadrants simultaneously about their axes whereby the wing-planes are moved outward into opposed forwardly-inclined relation relative to the fuselage body, pocket planes inter-associated with the aforesaid wing-planes and normally disposed in parallel juxtaposition thereto, and means actuable synchronously with the wing-plane operating mechanism for swinging the pocket planes into rearwardly inclined relation with respect to the wing-planes.

13. The combination with the fuselage body of an aeroplane of vertically hinged opposed wing-planes normally closable into the walls thereof, a bearing in the fuselage body having opposed brackets, laterally movable angle levers supported by said brackets, said angle levers having quadrants at their forward ends and horizontally rotatable rollers at their rear ends, tracks mounted on the inner faces of the wing-planes of slotted box-like formation in cross section and the forward ends whereof are closed in, said tracks serving as guides in which operate the aforesaid horizontally rotatable rollers, a contractile spring connecting the laterally movable angle levers for normally drawing them inward, means for swinging the quadrants simultaneously about their axes whereby the wing-planes are moved outward into opposed forwardly-inclined relation relative to the fuselage body, pocket planes inter-associated with the aforesaid wing-planes and normally disposed in parallel juxtaposition thereto, and means actuable synchronously with the wing-plane operating mechanism for swinging the pocket planes into rearwardly inclined relation with respect to the wing-planes.

14. The combination with the fuselage body of an aeroplane of vertically hinged opposed wing-planes normally closable into the walls thereof, a bearing in the fuselage body having opposed brackets, laterally movable angle levers supported by said brackets, said angle levers having quadrants at their forward ends and horizontally rotatable rollers at their rear ends, tracks mounted on the inner faces of the wing-planes of slotted box-like formation in cross section and the forward ends whereof are closed in, said tracks serving as guides in which operate the aforesaid horizontally rotatable rollers, a contractile spring connecting the laterally movable angle levers for normally drawing them inward, cable connections from the above mentioned quadrants to spaced quadrants on a horizontal shaft, means for turning said shaft partially about its axis whereby the wing-planes are simultaneously moved outward into opposed forwardly-inclined relation relative to the fuselage body, pocket planes of channel-shaped cross section hingedly mounted on the wing-planes, and means actuable synchronously with the wing-plane operating mechanism for swinging the pocket planes into rearwardly inclined relation with respect thereto.

15. The combination with the fuselage body of an aeroplane of vertically hinged opposed wing-planes normally closable into the walls thereof, a bearing in the fuselage body having opposed brackets, laterally movable angle levers supported by said brackets, said angle levers having quadrants at their forward ends and horizontally rotatable rollers at their rear ends, tracks mounted on the inner faces of the wing-planes of slotted box-like formation in cross section and the forward ends whereof are closed in, said tracks serving as guides in which operate the aforesaid horizontally rotatable rollers, a contractile spring connecting the laterally movable angle levers for normally drawing them inward, cable connections from the above mentioned quadrants to spaced quadrants on a horizotnal shaft, means for turning said shaft partially about its axis whereby the wing-planes are simultaneously moved outward into opposed forwardly-inclined relation relative to the fuselage body, pocket planes of channel-shaped cross section hingedly mounted on the wing-planes and having parallel flanged portions passing through horizontal slots therein, means operable synchronously with the aforementioned angle levers whereby said pocket planes are swung into rearwardly inclined relation with respect to the said wing-planes.

16. The combination with the fuselage body of an aeroplane of vertically hinged opposed wing-planes normally closable into the walls thereof, a bearing in the fuselage body having opposed brackets, laterally movable angle levers supported by said brackets, said angle levers having quadrants at their forward ends and horizontally rotatable rollers at their rear ends, tracks mounted on the inner faces of the wing-planes of slotted box-like formation in cross section and the forward ends whereof are closed in, said tracks serving as guides in which operate the aforesaid horizontally rotatable rollers, a contractile spring connecting the laterally movable angle levers for normally drawing them inward, cable connections from the above mentioned quadrants to spaced quadrants on a horizontal shaft, means for turning said shaft partially about its axis whereby the wing-planes are simultaneously moved outward into opposed forwardly-inclined relation relative to the fuselage body pocket planes of channel-shaped cross section hingedly mounted on the wing-planes and having parallel flanged portions passing through horizontal slots therein, a toggle frame pivotally mounted between the flanges of each channel-shaped pocket plane and operable by the aforesaid angle levers whereby the pocket planes are moved into rearwardly inclined relation with respect to the wing-planes.

17. A means for braking the momentum of flying machines comprising a wing-plane for hingedly mounting in the body walls thereof, a bearing having a laterally movable angle lever pivoted therein, said angle lever having a quadrant integral therewith at one end and horizontally rotatable rollers at the other end, a track on the inner face of the wing-plane in which the aforesaid horizontally rotatable rollers operate, a tension means for normally drawing the angle lever inward, a means for exerting a "pull" upon the quadrant whereby the wing-plane is outwardly swung into a forwardly-inclined position relative to the longitudinal axis of the flying machine, a pocket plane inter-associated with the aforesaid wing-plane and normally disposed in parallel juxtaposition thereto, and means actuable synchronously by the angle lever for swinging said pocket plane into rearwardly inclined relation with respect to said wing-plane.

18. A means for braking the momentum of aeroplanes comprising a wing-plane for hingedly mounting in the fuselage wall, a bearing having a laterally movable angle lever pivoted therein, said angle lever having a quadrant integral therewith at one end and horizontally rotatable rollers at the other end, a track on the inner face of the wing-plane in which the aforesaid horizontally rotatable rollers operate, a tension means for normally drawing the angle lever inward, a means for exerting a "pull" upon the quadrant whereby the wing-plane is outwardly swung into a forwardly-inclined vertical position relative to the longitudinal axis of the aeroplane, a pocket plane inter-associated with the aforesaid wing-plane and normally disposed in parallel juxtaposition thereto, and means actuable synchronously by the angle lever for swinging said pocket plane into rearwardly inclined relation with respect to said wing-plane.

19. A means for braking the momentum of aeroplanes comprising a wing-plane for hingedly mounting in the fuselage wall, a bearing having a laterally movable angle lever pivoted therein, said angle lever having a quadrant integral therewith at one end and horizontally rotatable rollers at the other end, a slotted box-like track having a closed forward end on the inner face of the wing-plane in which the aforesaid horizontally rotatable rollers operate, a contractile spring for normally drawing the angle lever and wing-plane flush into the fuselage wall, a cable connection from the aforesaid quadrant connecting with manually operable means whereby the wing-plane can be outwardly swung into a forwardly-inclined vertical position relative to the longitudinal axis of the aeroplane, a pocket plane inter-associated with the aforesaid wing-plane and normally disposed in parallel juxtaposition thereto, and means actuable synchronously with the movement of the angle lever for swinging said pocket plane into rearwardly inclined relation with respect to the wing-plane.

20. A means for braking the momentum of aeroplanes comprising a wing-plane for hingedly mounting in the fuselage wall, a bearing having a laterally movable angle lever pivoted therein, said angle lever having a quadrant integral therewith at one end and horizontally rotatable rollers at the other end, a slotted box-like track having a closed forward end on the inner face of the wing-plane in which the aforesaid horizontally rotatable rollers operate, a contractile spring for normally drawing the angle lever and wing-plane flush into the fuselage wall, a cable connection from the aforesaid quadrant connecting with manually operable means whereby the wing-plane can be outwardly swung into a forwardly-inclined vertical position relative to the longitudinal axis of the aeroplane, a channel-shaped pocket plane hingedly mounted on the wing-plane and having parallel flanged portions passing through horizontal slots therein, and means actuable synchronously with the movement of the angle lever for swinging said pocket plane into rearwardly inclined relation with respect to said wing-plane.

21. A means for braking the momentum of aeroplanes comprising a wing-plane for hingedly mounting in the fuselage wall, a bearing having a laterally movable angle lever pivoted therein, said angle lever having a quadrant integral therewith at one end and horizontally rotatable rollers at the other end, a slotted box-like track having a closed forward end on the inner face of the wing-plane in which the aforesaid horizontally rotatable rollers operate, a contractile spring for normally drawing the angle lever and wing-plane flush into the fuselage wall, a cable connection from the aforesaid quadrant connecting with manually operable means whereby the wing-plane can be outwardly swung into a forwardly-inclined vertical position relative to the longitudinal axis of the aeroplane, a channel-shaped pocket plane hingedly mounted on the wing-plane and having parallel flanged portions passing through horizontal slots therein, and a toggle frame pivotally mounted between the parallel flanges and connecting with the aforesaid angle lever whereby said pocket plane is synchronously moved into rearwardly inclined relation with respect to the wing-plane when the latter is outwardly moved.

In testimony whereof I affix my signature.

CHARLES P. SALGEE.